(12) United States Patent
Esaki

(10) Patent No.: US 6,279,220 B1
(45) Date of Patent: *Aug. 28, 2001

(54) AUTOMATIC ASSEMBLING METHOD AND APPARATUS FOR ASSEMBLING PHOTOGRAPHIC CASSETTES

(75) Inventor: Toshiro Esaki, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,141

(22) Filed: Mar. 31, 1997

Related U.S. Application Data (63) Continuation of application No. 08/233,261, filed on Apr. 26, 1994, now abandoned.

(51) Int. Cl.$^7$ .............................. B23P 11/00; B21D 39/00
(52) U.S. Cl. ............................ 29/430; 29/434; 29/455.1; 29/463; 29/469; 29/525
(58) Field of Search ..................... 198/345.3; 29/464, 29/430, 434, 455.1, 463, 469, 525, 806, 784, 799

(56) References Cited

U.S. PATENT DOCUMENTS

| | | | |
|---|---|---|---|
| 3,364,551 | * 1/1968 | Napor et al. | 29/211 X |
| 3,832,432 | * 8/1974 | Perry | 29/783 X |
| 3,882,991 | * 5/1975 | Chayka et al. | 198/19 |
| 4,080,711 | 3/1978 | Kawada et al. | 29/427 |
| 4,486,932 | * 12/1984 | Hall et al. | 29/430 X |
| 4,614,019 | 9/1986 | Shimizu et al. | 29/450 |
| 4,674,181 | * 6/1987 | Hamada et al. | 29/791 X |
| 4,674,594 | * 6/1987 | Jensen | 29/430 X |
| 4,685,277 | * 8/1987 | Ilsemann | 53/474 |
| 4,716,650 | * 1/1988 | Utsui et al. | 29/430 |
| 4,783,904 | * 11/1988 | Kimura | 29/783 X |
| 4,815,190 | 3/1989 | Haba, Jr. et al. | 29/430 |
| 4,834,306 | 5/1989 | Robertson et al. | 242/71.1 |
| 4,846,418 | 7/1989 | Fairman | 242/71.1 |
| 5,049,912 | 9/1991 | Pagano et al. | 354/275 |
| 5,353,490 | * 10/1994 | Kukuljan | 29/564 |
| 5,653,005 | 8/1997 | Speller et al. | |

FOREIGN PATENT DOCUMENTS

| | | | |
|---|---|---|---|
| 0043208 | 1/1982 | (EP) | B23Q/41/00 |
| 2406815 | 9/1991 | (EP) | G03B/17/30 |
| 0211430 | * 12/1982 | (JP) | 29/799 |
| 59-073241 | 4/1984 | (JP) | |
| 60-161038 | 8/1985 | (JP) | |
| 61-236465 | 10/1986 | (JP) | |
| 62-114859 | 5/1987 | (JP) | |
| 1295746 | 11/1989 | (JP) | |
| 4209121 | 7/1992 | (JP) | B65G/47/52 |
| 5016060 | 1/1993 | (JP) | |
| 5023925 | 2/1993 | (JP) | |

\* cited by examiner

Primary Examiner—S. Thomas Hughes
Assistant Examiner—Marc Jimenez
(74) Attorney, Agent, or Firm—Sughrue, Mion, Zinn, Macpeak & Seas PLLC

(57) ABSTRACT

Automatic assembling method and apparatus using a plurality of pallets on a conveyer belt for assembling photographic film cassettes, or the like. Each pallet has a secondary work holder and a primary work holder. Parts of a secondary assembly are sequentially fed to the secondary work holder and are assembled into the secondary assembly in the secondary work holder. The secondary assembly and other parts of a primary assembly are sequentially fed to the primary work holder and are assembled into the primary in the primary work holder.

5 Claims, 6 Drawing Sheets

AUTOMATIC ASSEMBLING METHOD AND APPARATUS FOR ASSEMBLING PHOTOGRAPHIC CASSETTES

This is a continuation of application Ser. No. 08/233,261 filed Apr. 26, 1994 now abandoned.

BACKGROUND OF THE INVENTION

1. Field of the Invention

The present invention relates to an automatic assembling method, and more particularly to a method of automatically assembling a photographic film cassette, or the like, and an apparatus for practicing the method.

2. Description of the Related Art

Photographic film of the 135 type, contained in a cassette, as among the most popular formats of photographic film. A known 135 photographic film cassette has a cassette shell constituted of a cylindrical body formed of a thin metal sheet and two caps fitted thereon. The cassette shell has a spool contained therein on which photographic film is wound in a form of a roll. To assemble this photographic film cassette, several methods are known. For example, U. S. Pat. No. 4,614,019 (corresponding to Japanese Patent Publication No. 2-691) discloses a process of winding the photographic film on the spool, and then assembling the cassette in a darkroom: U. S. Pat. No. 4,080,711 (corresponding to Japanese Patent Publication No. 60-48748) discloses a process of bringing the assembled cassette shell into the darkroom, disassembling the cassette shell for insertion of the photographic film, inserting the photographic film wound on the spool, and then assembling the cassette shell.

U. S. Pat. No. 4,834,306, U. S. Pat. No. 4,846,418 and European Publication EP-A2 0 406 815 (corresponding to Japanese Patent Laid-open Publication No. 3-37645), each disclose a photographic film cassette in which a cassette shell is constituted of parts formed from resin, and rotation of a spool causes a leader of the photographic film to exit to the outside of the cassette. Such a leader-advancing cassette is different from conventional photographic film cassettes because the leader of the photographic film is fully contained within the cassette both before exposure and after exposure. Such a cassette is advantageous in that the photographic film is reliably protected from accidental exposure to ambient light, and in that the cassette is easily handled.

Such a leader-advancing cassette includes elements not utilized in conventional cassettes. As disclosed, for example, in U. S. Pat. No. 4,834,306 (corresponding to Japanese Patent Laid-open Publication No. 1-306845) and U. S. Pat. No. 5,049,912, a light-shielding shutter member may be mounted openably in a photographic film passage port of this type of film cassette for protecting the inside from ambient light. Or a visual indicator member may be incorporated in such a cassette, to appear externally for indicating the exposed condition of the photographic film. However, production of such a leader-advancing cassette has many inherent problems due to the increase in the number of the parts. Particularly when the cassette shells must be assembled or disassembled in a darkroom, the assembling operation is so complicated that production efficiency is difficult to increase. In such a case, even an automated assembling machine does not reliably increase production efficiency.

The problems are more complicated for a photographic film cassette wherein a spool is an assembly constituted of a pair of flanges force-fitted of the spool core, and the spool assembly is mounted in one shell half before the other shell half is joined therewith. This is because an independent assembling process for assembling the spool assembly is necessary before a primary assembling process of the film cassette, wherein the spool assembly, the shutter plate and other parts are mounted into the cassette. In such a case, there are at least two assembling lines and at least a transfer conveyor for connecting the two lines. Therefore, the mechanism of the conventional system are complicated. The need for transferring works between the lines increases the occurrence of problems. The same problem as described above could generally arise in other automatic assembling systems, where a secondary assembly should be incorporated into a primary assembly.

On the other hand, a constant tact intermittent transport linear base machine for moving an endless conveyor member such as a belt or a chain periodically by a constant amount, is known, for example, from Japanese Patent Laid-open Publication 4-209121, wherein pallets are secured to the endless conveyor member. When assembling works by using such a constant tact intermittent transport linear base machine, if positions of the pallets get out of order because of jamming of the works, stop positions of the pallets must be readjusted to restore the accuracy of assemblage. Readjustment requires a great deal of time so that the efficiency of the assembly process decreases.

Conventional constant tact intermittent linear base machines further have a problem in that the pallet must be decoupled from and coupled to the conveyor to be fed back to the assembling line, through a feed back line, after the completion of assemblage on that pallet. The decoupling-coupling operations often cause problems especially in a high speed tact system.

SUMMARY OF THE INVENTION

In view of the above problems, an object of the present invention is to provide an automatic assembling method, and an apparatus for that method, which enables a high efficiency assembly operation, even when a secondary assembly must be assembled into a primary assembly in a primary assembling process, while the secondary assembly is assembled in an independent secondary assembling process.

Another object is to provide an automatic assembling apparatus which uses a constant tact intermittent transport linear base machine, but eliminates deviation of pallets and trouble in decoupling and coupling of the pallet being conveyed at short intervals.

A further object of the present invention is to provide an automatic assembling method for assembling a cassette shell of a film cassette inclusive of a spool assembly in a single assembling line.

To achieve the above and other objects, according to the present invention, each of a plurality of integrally formed pallets has a secondary work holder and a primary work holder which are arranged in the same desired positions. Parts of a secondary assembly are sequentially fed to the secondary work holder and are assembled into the secondary assembly in the secondary work holder in each pallet during conveying the pallets. The secondary assembly and other parts of a primary assembly are sequentially fed to the primary work holder and are assembled into the primary assembly in the primary work holder in each pallet during conveying the pallets.

Therefore, it is unnecessary to provide a secondary assembling line for assembling the secondary assembly separately from a primary assembling line for the primary assembly. Because of the single assembling line, it is unnecessary to provide interconnecting devices such as a synchronizing device and a buffer conveyor, which would otherwise be necessary for connecting the primary and secondary assembling lines.

BRIEF DESCRIPTION OF THE DRAWINGS

Other objects and advantages of the present invention will become apparent from the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
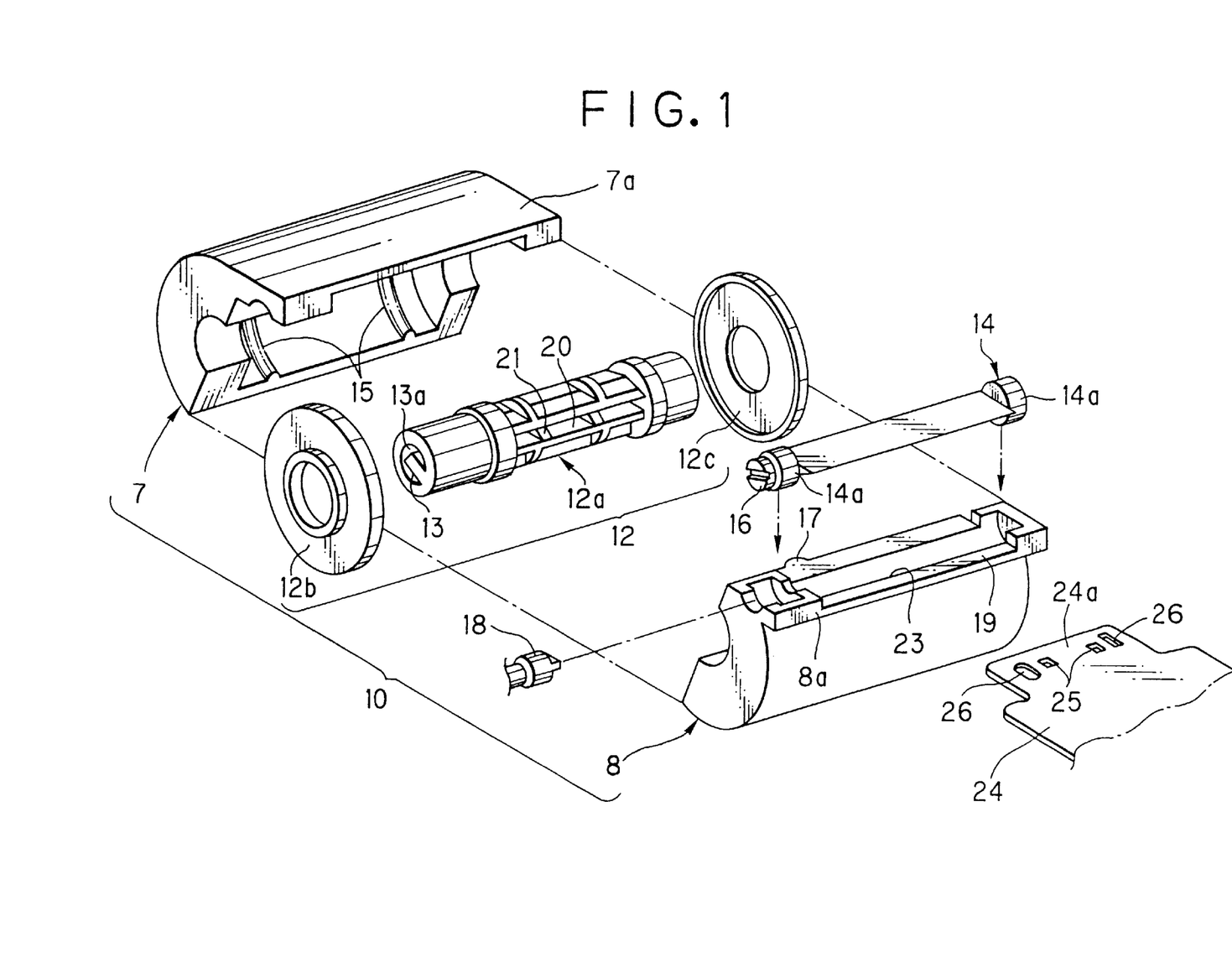
FIG. 1 is an exploded perspective view illustrating an example of a leader-advancing film cassette.

FIG. 1 illustrates a photographic film cassette to be assembled by a cassette assembling apparatus according to a preferred embodiment of the present invention as shown in FIGS. 2–7. A spool assembly 12 is contained in a cassette shell 10 constituted of a pair of shell halves 7 and 8 molded from resin. Ridges 15 are formed on the inside of the shell halves 7 and 8. When photographic film 24 is wound around the spool assembly 12 and contained within a chamber defined between the shell halves 7 and 8, the ridges 15 are in contact with the outermost turn of the photographic film 24 to prevent the roll of the photographic film 24 from loosening. When the spool assembly 12 is rotated in the direction to unwind the film 24, clockwise in FIG. 1, the roll of the photographic film 24 is also rotated clockwise. A separator claw 17 is formed inside of shell half 8. During rotation of the roll of the photographic film 24, a leading end of the photographic film abuts on the separator claw 17, which separates the leading end from the roll of the film 24.

Port walls 7a and 8a are formed on the shell halves 7 and 8, respectively. When the shell halves 7 and 8 are joined together, the port walls 7a and 8a define a photographic film passage port 19. A shutter 14 is rotatably mounted in a cylindrical cavity formed by a pair of semi-cylindrical recesses 23 formed inside the port walls 7a and 8a. Both ends of the shutter 14 are provided with rotary shaft portions 14a to be borne between the port walls 7a and 8a, so that the shutter 14 is rotatable about an axis which is parallel to the spool assembly 12. An end of the shaft portions 14a has a key 16, which extends through a hole formed in the cassette shell 10. When an opener member 18 is fitted on the key 16 and rotates the key 16, the shutter 14 is rotated between positions of blocking and opening a film passage 19 formed between the port walls 7a and 8a.

The spool assembly 12 is constituted of a spool core 12a and a pair of flanges 12b fitted on the spool core 12a. The photographic film 24 is wound on the spool core 12a between the flanges 12b. Both ends of the spool assembly 12 extend through faces of the cassette shell 10, and are provided with keys 13. The keys 13 are used for engagement with a drive member for rotating the spool assembly 12 in a known manner. A notch 13a is formed in one of the keys 13, for externally indicating the rotational position of the spool assembly 12. This indication is necessary for inserting the film trailer 24a into a slot 20 formed along the spool core 12a.

Inside the slot 20 are arranged two retaining claws 21 and a slip-preventive ridge which is not shown but extends in the direction opposite to, and are disposed between, the retaining claws 21. The right side of the slot 20 is adapted to receive the film trailer 24a. The film trailer 24a has a pair of retaining holes 25 formed therein, which are engageable with the retaining claws 21. The slip-preventing ridge presses the trailer end 24a in the direction opposite to projecting of the retaining claws 21, so that the holes 25 are maintained engaged with the retaining claws 21, even if a force tending to pull the photographic film 24 from the slot 20 should be applied to the trailer 24a. The trailer 24a is further provided with a pair of pick-up holes 26 which are disposed outside the pair of retaining holes 25 in the lateral direction of the film 24. The pick-up holes 26 are used for inserting the film trailer 24a into the slot 20 with a jig.

Figure 2:
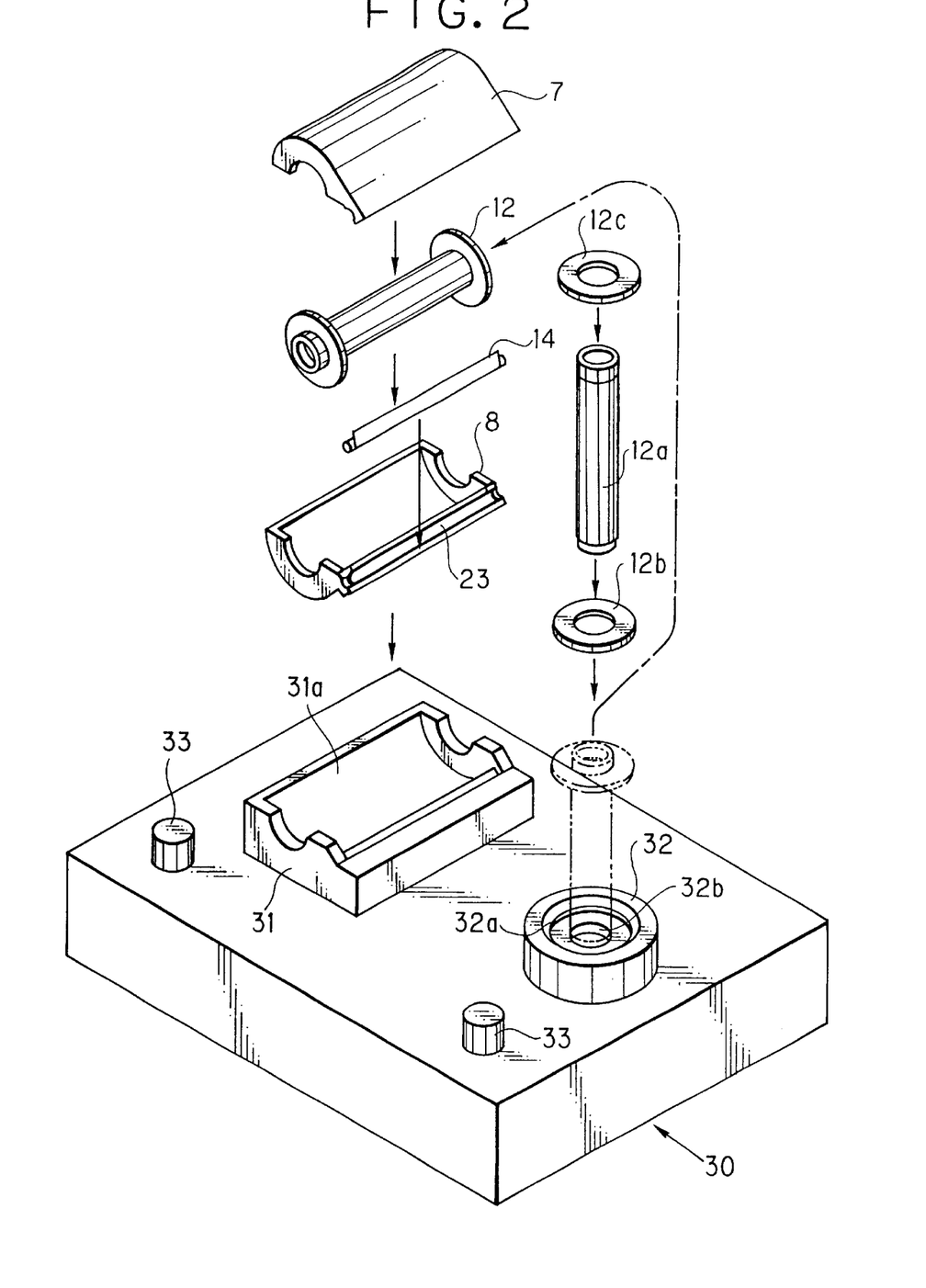
FIG. 2 is an explanatory perspective view of a pallet utilized for assembling a spool assembly and a cassette shell of the leader-advancing film cassette shown in FIG. 1, according to a preferred embodiment of the apparatus.

FIG. 2 illustrates a pallet 30 utilized for assembling the above-described photographic film cassette. The pallet 30 has a shell holder 31 for holding the one shell half 8, hereinafter referred to as a lower shell half 8, and a spool holder 32 for holding the spool assembly 12. The pallet 30 also has a pair of positioning pins 33 utilized for positioning the pallet 30 in respective assembling stations, as will be described in detail below.

The spool holder 32 has a flange accepting recess 32a and a spool core accepting hole 32b formed therein. After the flange 12b is positioned in the recess 32a, the spool core 12a is inserted in the hole 32b, while force-fitting the spool core 12a through the flange 12b. Thereafter, the other flange 12c is force fitted on the opposite upper end of the spool core 12a, completing the spool assembly 12. The shell holder 31 is secured to the pallet 30, and has a recess 31a formed therein, whose inside surface corresponds to the outward form of the lower shell half 8. After the lower shell half 8 is placed in the shell holder 31, the spool assembly 12 is pulled off the spool holder 32 and is placed in the lower shell half 8. The other or upper shell half 7 is then joined to the lower shell half 8 to complete the cassette shell 10. Finally, the complete cassette shell 10 is removed from the shell holder 31.

The above-described spool assembling operations and the assembling operations for the cassette shell 10 are performed by an assembling unit constituted of a series of pick-and-place devices, as will be described below with respect to a preferred embodiment.

Figure 3:
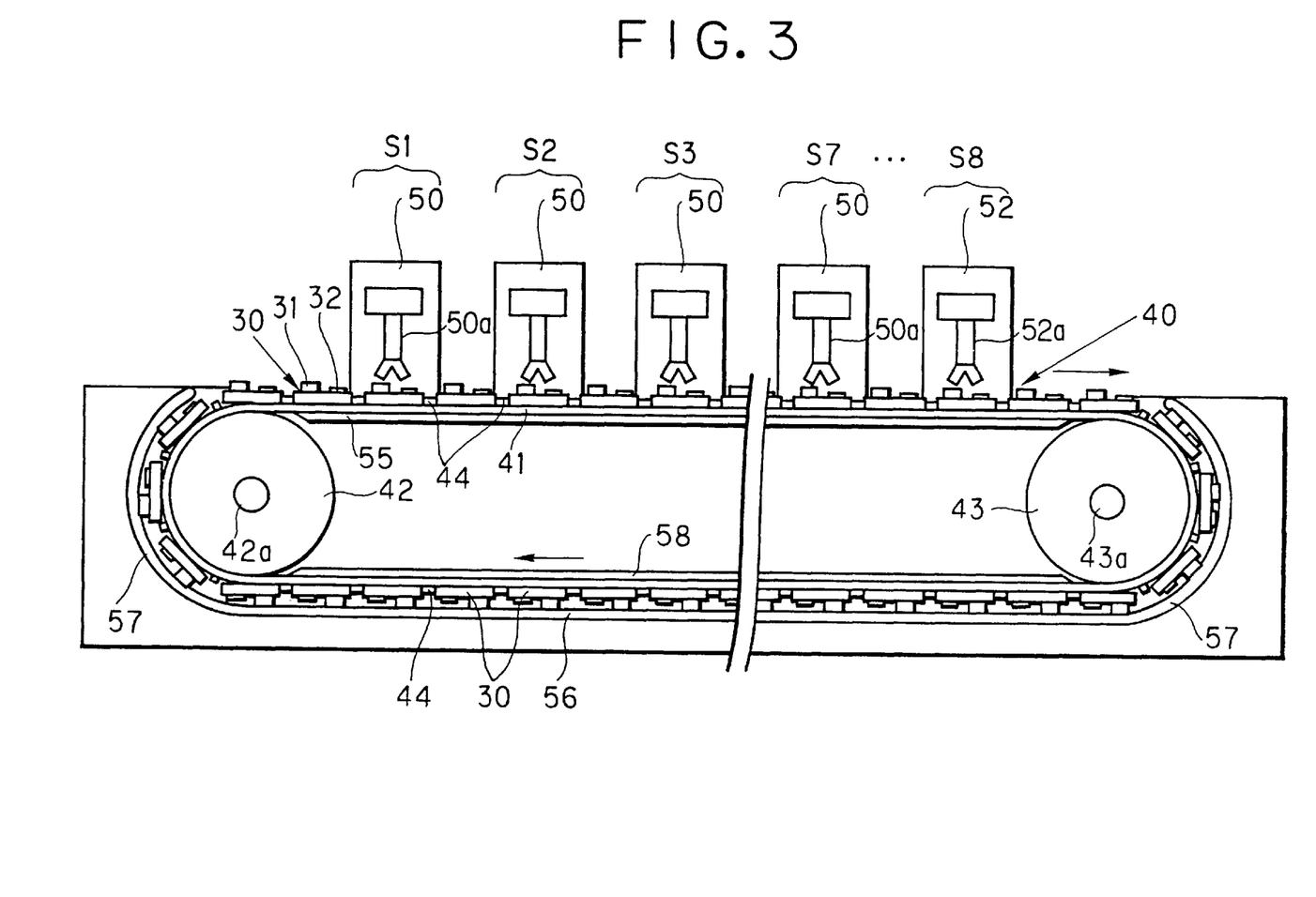
FIG. 3 is a schematic side view of a pallet conveyor.
Figure 4:
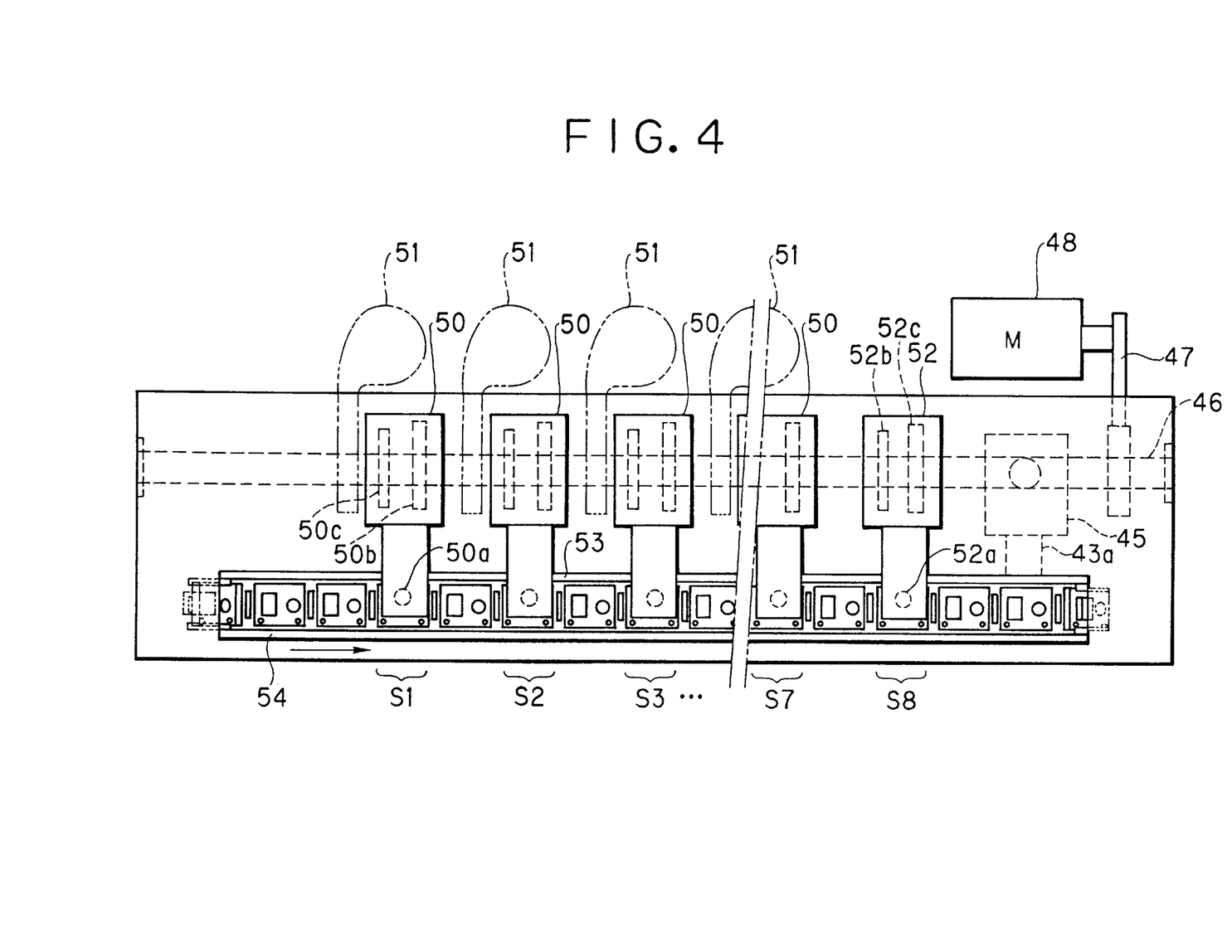
FIG. 4 is a schematic top plan view illustrating the pallet conveyor shown in FIG. 3 and an assembling unit of the preferred embodiment.

The pallets 30 are successively conveyed by a pallet conveyer 40, for example, as shown in FIGS. 3 and 4. The pallet conveyer 40 is constituted of an endless belt 41 circulating in a horizontal attitude around pulleys 42 and 43 whose rotary shafts 42a and 43a extend in parallel with each other in a horizontal plane. This construction of a pallet conveyer requires only a simple drive mechanism. The endless belt 41 has a plurality of pallet spacers 44 mounted on the bearing surface thereof. The pallet spacers 44 are spaced equally in the longitudinal direction of the belt 41 by a distance slightly longer than the length of the pallets 30. The pallet spacers 44 are rectangular ridges projecting from the bearing surface of the belt 41, which confine the pallets 30 at the leading and trailing ends thereof in the conveying direction or the longitudinal direction of the pallets 30 during the conveying. Instead of the rectangular ridges 44, pallet spacers may be formed by pins which are adopted to be loosely engaged in holes which may be formed in the bottom of pallets.

As shown in FIG. 4, the shaft 43a of the puller 43 is coupled to a constant angle rotation unit 45 for controlling constant tact intermittent transport of the endless belt 41. The unit 45 is driven by a cam shaft 46 to cause the pulley 43 to rotate intermittently by through a constant incremental angle. Thereby, the pallets 30 are periodically advanced by a constant amount through the endless belt 41. The cam shaft 46 is driven by a drive motor 48 through a transmission belt 47.

A plurality of pick-and-place devices 50 are disposed along an upper path of the endless belt 41 of the pallet conveyer 40 in every other stop position of the pallets 40, to assemble the respective parts of the cassette shell 10, such as the shell halves 7 and 8, the shutter plate 14, the spool core 12a and the flanges 12b and 12c, appropriately in the holders 31 and 32 of the pallets 30. In each pick-and-place device 50, a designated part is picked up by one end of an arm 50a, and simultaneously the same part is mounted on an appropriate place by the other end of the arm 50a.

A pick-and-place device 52, which is disposed at a last position in the pallet conveying direction, removes the complete cassette shell 10 from the shell holder 31 and discharges it from the assembling line, that is, the upper path of the endless belt 41. The pick-and-place device 52 also has an arm 52a which operates in the same way as the arms 50a. The pick-and-place devices 51 and 52 are also driven by the cam shaft 46 through cam members 50b, 50c, 52b and 52c, respectively, in a conventional manner.

Parts feeders 51 are disposed beside the pick-and-place devices 50, each for feeding the designated parts one after another to the associated pick-and-place device 50. Of course, no parts feeder is allocated to one of the pick-and-place devices 50 which serves to mount the complete spool assembly 12 into the lower shell half 8. Hereinafter, the stop positions of the pallets 30 corresponding to the pick-and-place devices 50 and 52 will be referred to as assembling stations S1 to S8.

Figure 5:
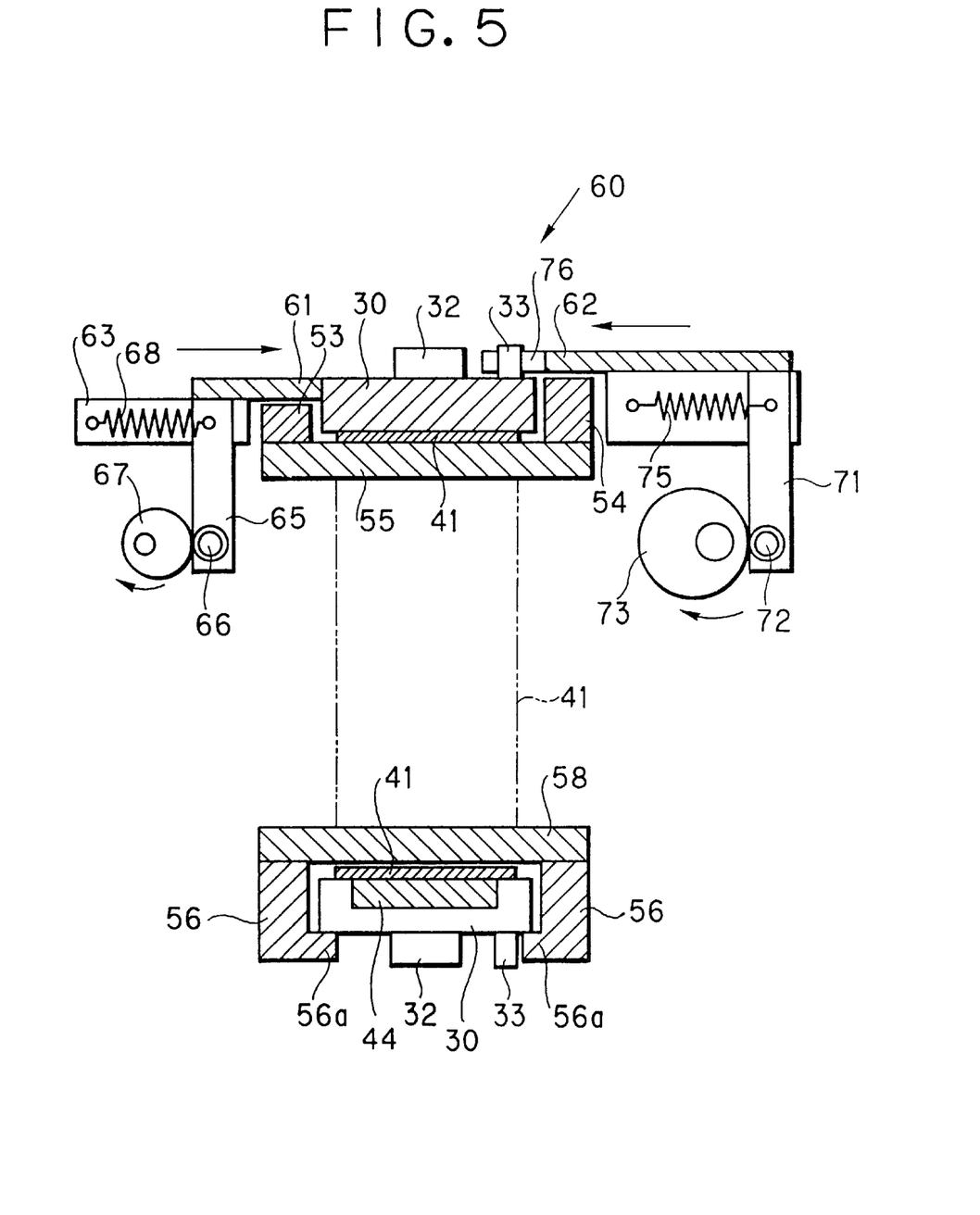
FIG. 5 is an enlarged top plan view of the pallet positioned on the pallet conveyor by a pallet positioning unit of the preferred embodiment.

As shown in FIG. 5, pallet guide fences 53 and 54 are provided on lateral sides of the endless belt 41 along the upper path of the belt 41, to limit lateral movement of the pallets 30 on the endless belt 41. The pallet guide fences 53 and 54 are mounted on an upper surface of a guide base 55, on which the endless belt 41 is guided in the horizontal state. Along a lower path of the endless belt 41 and around the pulleys 42 and 43, anti-drop guide rails 56 and 57 are provided for preventing the pallets 30 from dropping off the endless belt 41, as is shown in FIG. 5. The anti-drop guide rails 56 and 57 are mounted to a guide base 58. The anti-drop guide rails 56 are constituted of a pair of fences disposed along the lateral sides of the endless belt 41 and having hooks 56a which catch the lateral edges of the pallets 30. Therefore, the pallets 30 may not drop down in spite of their weight. The anti-drop guide rails 57 have the same construction and function as the anti-drop guide rails 56. The lower path of the endless belt 41 functions as a feed back line for feeding empty pallets 30 back to the assembling line.

Because the pallets 30 are not secured to the endless belt 41, but are removably held by the pallet spacers 44 and the guide fences 53 and 54, maintenance and positioning of the pallets 30 are each independently adjustable in individual assembling stations. By providing the anti-drop guide rails 56 and 57, the pallets 30 may be conveyed cyclically on the endless belt 41 without the need for decoupling the pallets 30 from the endless belt 41 and then coupling the same to the endless belt 41. Therefore, a high speed of transport or short interval between transport steps may be achieved with reliability.

Figure 6:
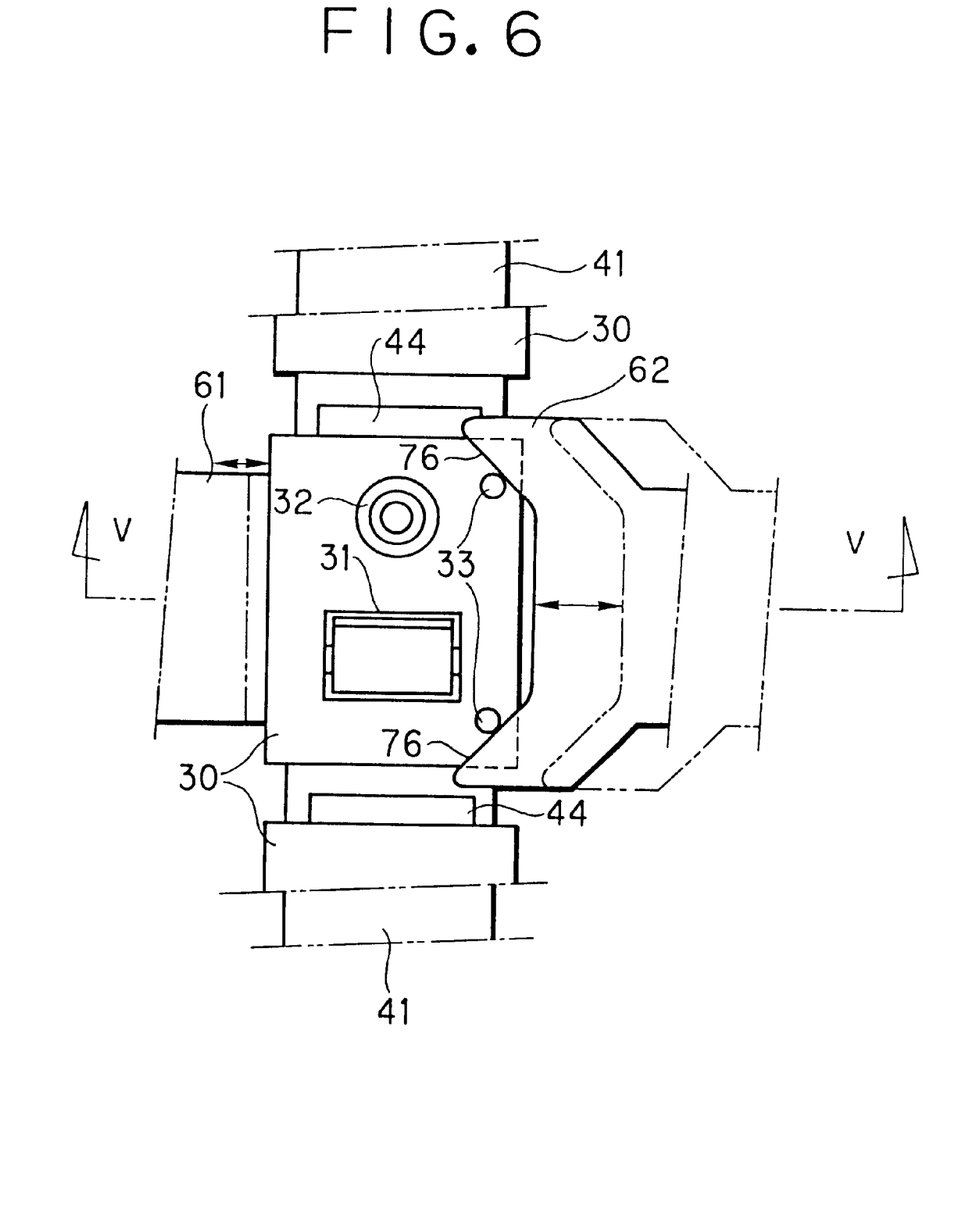
FIG. 6 is a top view of the positioning unit of FIG. 5.

As shown in FIGS. 5 and 6, a positioning unit 60 is disposed in association with each pick-and-place devices 50 and 52. The positioning unit 60 has a lateral positioning plate 61 and a longitudinal positioning plate 62. The lateral positioning plate 61 is mounted to a guide plate 63 to be movable in the lateral direction of the pallet 30. The lateral positioning plate 61 is secured to a bracket 65 having a cam follower 66 secured thereto. The cam follower 66 contacts an eccentric cam 67, and a coiled spring 68 suspended between the bracket 65 and the guide 63 urges the cam follower 66 toward the cam 67. Accordingly, the lateral positioning plate 61 is urged away from the pallet 30. The cam 67 is driven through the cam shaft 46 to rotate at an angle of 180 degrees in each step.

The longitudinal positioning plate 62 is mounted to a guide plate 70 to be movable in the lateral direction of the pallet 30. The lateral positioning plate 62 is secured to a bracket 71 having a cam follower 72 secured thereto. The cam follower 72 contacts an eccentric cam 73, and a coiled spring 75 suspended between the bracket 71 and the guide plate 70 urges the cam follower 72 toward the cam 73. Accordingly, longitudinal positioning plate 62 is urged toward the pallet 30. The eccentric cam 73 is also driven through the can shaft 46 to rotate at an angle of 180 degrees in each step.

The longitudinal positioning plate 62 has a pair of symmetrical slopes 76 spaced from each other in the longitudinal direction of the endless belt 41, such that the slopes 76 are brought into tangential contact with the positioning pins 33 of the pallet 30 to push the pins 33 toward each other when the longitudinal positioning plate 62 is moved toward the pallet 30.

While the pallets 30 are conveyed on the endless belt 41 by one step, that is, from one stop position to the next, the cam shaft 46 causes the eccentric cams 67 and 73 to rotate by one step, that is, by 180 degrees. Each time the pallets 30 are stopped at the respective assembling stations S1 to S8, the eccentric cams 67 and 73 are set in the positions shown in FIG. 5, wherein the cam 67 pushes the cam follower 66 to move the bracket 65 against the force of the spring 68 and thus move the lateral positioning plate 61 toward the pallet 30 into a predetermined position, as is shown by solid line in FIG. 6. Concurrently, the longitudinal positioning plate 62 is moved toward the pallet 30 under the force of the spring 75, as is shown by solid line in FIG. 6. Thereby, the pallet 30 is pushed against the lateral positioning plate 61, to be positioned in the lateral direction.

Because the positioning pins 33 are pushed toward each other by the slopes 76 while the longitudinal positioning plate 62 is moved toward the pallet 30, the pins 33 are centered on the symmetrical axis of the slopes 75, so that the pallet 30 is positioned in the longitudinal direction. While the pallets 30 are advanced from one assembling station to another, the eccentric cams 67 and 73 are rotated by two steps, that is, by 360 degrees, so that the positioning plates 61 and 62 make one reciprocation to be retracted from and then moved toward the pallet 30, as is indicated by arrows and phantom lines in FIG. 6.

The assembling operations of the cassette shell 10 are performed, for example, in the following sequence.

The respective pallets 30 are periodically advanced by the pallet conveyer 40 to be seriatim fed to the respective assembling stations S1 to S8, as is shown in FIGS. 3 and 4. In the first assembling station S1, the pick-and-place device 50 mounts the lower shell half 8 in the shell holder 31 of the pallet 30, as is shown in FIG. 2. Next, the shutter 14 is mounted in the semi-cylindrical recess 23 of the lower shell half 8 in the second assembling station S2. In the third assembling station S3, the flange 12b is set in the flange accepting recess 32a of the spool holder 32 of the pallet 30. In the fourth assembling station S4, the spool core 12a is fitted in the spool core accepting hole 32b of the spool holder 32, thereby force-fitting the flange 12b on one end of the spool core 12a. In the fifth assembling station S5, the flange 12c is fitted on the other end of the spool core 12a which is still fitted in the spool core accepting hole 32b. In the sixth assembling station S6, the complete spool assembly 12 is pulled off the spool holder 32 and mounted in the lower shell half 8 held in the shell holder 31. In the seventh assembling station S7, the pick-and-place device 50 joins the upper shell half 7 to the lower shell half 8, through ultrasonic welding or the like, in the shell holder 31, to complete the cassette shell 10. In the last station S8, the pick-and-place unit 52 removes the cassette shell 10 from the shell holder 31 to transfer the shell 10 to another line. The pallet conveyer 40 feeds the empty pallet 30 back to the first assembling station S1. The control and activation of various functions with pick-and-place units 52 is well known.

In alternative, it is possible to first perform assembling of the spool assembly 12 in the side of the spool holder 32, and thereafter start assembling in the side of the shell holder 31. The flanges may be secured to the spool core through hooking, caulking, cementing or the like. It is, of course, possible to provide more than either stations so as to assemble a cassette shell having a larger number of parts than the cassette shell shown in FIG. 1, such as disclosed in U. S. Pat. No. 5,049,912.

As described so far, according to the present invention, each pallet has a secondary work holder, such as a spool holder, besides a primary work holder, such as a shell holder, so that parts of a secondary assembly, such as a spool assembly, are sequentially assembled in the side of the secondary work holder, and parts of a primary assembly, such as a cassette shell, which includes the secondary assembly as one of its parts, are sequentially assembled in the primary work holder, while the pallet is conveyed along a single assembling line.

Therefore, it is unnecessary to provide a secondary assembling line for assembling the secondary assembly separately from a primary assembling line for the primary assembly. Because of the single assembling line, it is also unnecessary to provide interconnecting devices such as a synchronizing device and a buffer conveyer, which would otherwise be necessary for connecting the primary and secondary assembling lines. Therefore, the assembling apparatus of the present invention may be simple in construction and facilitates increasing assembling speed and efficiency. The assembling apparatus of the present invention may also be constructed at reduced expense as it requires merely a single drive motor and a constant angle rotation unit for transporting pallets intermittently at a constant tact or pitch. It also requires merely one type of pallet. Moreover, malfunctions may be reduced because the need for handing the workpieces is reduced. The pallets of the preferred embodiment are integrally formed, i.e., are assembled from one or more pieces in a single unitary structure.

While the present invention has been described with respect to a preferred embodiment for automatic assembling of the cassette shell 10, the present invention is applicable to automatic assembling of any kind of article wherein a secondary assembly should be incorporated in a primary assembly.

Also, it will be apparent to one skilled in the art that various other modifications can be made to the disclosed embodiment without departing from the scope of the invention as defined by the appended claims.

What is claimed is:

1. An automatic assembling method using a plurality of integrally formed pallets each having a primary work holder and a secondary work holder, a pallet conveyer for conveying said pallets cyclically and intermittently to stop said pallets at predetermined stations each having an assembly apparatus, wherein the pallets are independently adjustable on the pallet conveyer, said method comprising the steps of:

a first step of conveying one of the pallets to a first predetermined station to be opposite to a first assembly apparatus, the conveyed pallet having a partially completed secondary assembly disposed in the secondary work holder of the pallet;

a second step of the assembly apparatus sequentially feeding and assembling a part for the secondary assembly to said partially completed secondary assembly;

a third step of conveying the pallet to a second predetermined station to be opposite to a second assembly apparatus;

a fourth step of sequentially feeding said secondary assembly to said primary work holder and assembling said secondary assembly into a primary assembly disposed in the primary work holder of the pallet;

a fifth step, performed after the fourth step, of removing the primary assembly from the pallet, wherein the primary assembly removed from the pallet is a completed assembly; and individually adjusting the position of the pallets on the pallet conveyer in relation to each of the predetermined stations by moving the pallets with respect to the pallet conveyer in a longitudinal direction and a lateral direction while the pallets are disposed on the pallet conveyer, wherein the primary and secondary work holders each have an inside surface corresponding to the outward forms of the primary and secondary assemblies, respectively, such that the primary and secondary assemblies cooperate with the primary and secondary work holders, respectively, wherein each of said assembly apparatuses feeds only one of said parts to each of said pallets, and wherein said first through fifth steps are performed in a single assembly line.

2. An automatic assembling method as recited in claim 1, wherein, during said fourth step, said secondary assembly is transferred from said secondary work holder to said primary work holder at said second predetermined station.

3. The automatic assembling method as recited in claim 2, wherein said work holders are mounted on one side of each of said pallets at corresponding positions of each of said pallets.

4. An automatic assembling method for assembling a cassette shell of a photographic film cassette having a pair of shell halves and a spool assembly, by using a plurality of integrally formed pallets each having a shell assembling portion and a spool assembling portion, wherein the shell and spool assembling portions each have an inside surface corresponding to the outward forms of at least one of the shell halves and the spool assembly, respectively, such that the shell and spool assembling portions cooperate with the shell half and spool assembly, respectively, a pallet conveyer for conveying said pallets cyclically and intermittently to stop said pallets at predetermined stations each having an assembly apparatus, wherein the pallets are independently adjustable on the pallet conveyer, said method comprising:

(a) conveying one of the pallets opposite to at least one of the assembly apparatuses, the conveyed pallet having a partially completed spool assembly disposed in the spool assembling portion of the pallet;

(b) feeding and assembling parts for said spool assembly to a partially completed spool assembly disposed in said spool assembling portion of each of said pallets in a predetermined sequence of assembling, one part for each predetermined stop position of said pallet, fed by the corresponding assembly apparatus, the assembling apparatuses assembling said parts into said spool assembly at said spool assembling portion;

(c) feeding one shell half, said spool assembly and another shell half in this order to said shell assembling portion of the pallet with said assembling apparatus, at least one of said assembling apparatuses assembling these parts as each part is fed, into said cassette shell, wherein each of (a) through (c) is performed in a single assembly line; and (d) individually adjusting the position of the pallets on the pallet conveyer in relation to each of the predetermined stations by moving the pallets with respect to the pallet conveyer in a longitudinal direction and a lateral direction while the pallets are disposed on the pallet conveyer.

5. A method for the automatic assembling of a primary assembly which is comprised of primary assembly parts and a secondary assembly, said secondary assembly being comprised of secondary assembly parts, said method comprising the steps of:

cyclically and intermittently conveying pallets on a pallet conveyer so that said pallets each stop at predetermined stations, including a first station, a last station, and a remainder of stations, each of said pallets stopped at each of said predetermined stations defining a respective stopped pallet of said each station, each of said pallets having assembling portions, including a respective primary and a respective secondary assembling portion wherein the primary assembling portion has an inside surface corresponding to the outward form of at least one of the primary assembly parts and the secondary assembling portion has an inside surface corresponding to the outward form of the secondary assembly, such that the primary assembly part and the secondary assembly cooperate with the primary and secondary assembly portions respectively, each of said stations having a respective assembly apparatus, wherein the pallets are independently adjustable on the pallet conveyer, and individually adjusting the position of the pallets on the pallet conveyer in relation to each of the predetermined stations by moving the pallets with respect to the pallet conveyer in a longitudinal direction and a lateral direction while the pallets are disposed on the pallet conveyer;

at said first station, feeding only a first one of said secondary assembly parts to said secondary assembling portion of said respective stopped pallet; then in a predetermined sequence, assembling said secondary assembly by feeding and assembling, at each of selected ones of said remainder of stations, only a respective one of said secondary assembly parts to said secondary assembling portion of said respective stopped pallet; then at predetermined ones of said remainder of stations, feeding said secondary assembly and one or more of said primary assembly parts to said primary assembling portion of said respective stopped pallet, and main-assembling said secondary assembly and said primary assembly parts to complete said primary assembly; then at said last station, removing said primary assembly, wherein each of said steps is performed in a single assembly line.

* * * * *

UNITED STATES PATENT AND TRADEMARK OFFICE
CERTIFICATE OF CORRECTION

PATENT NO. : 6,279,220 B1
DATED : August 28, 2001
INVENTOR(S) : Toshiro Esaki

It is certified that error appears in the above-identified patent and that said Letters Patent is hereby corrected as shown below:

<u>Title page,</u>
Item [30], insert -- Foreign Application Priority Data
      April 26, 1993   Japan ........................5-99885 --.

Signed and Sealed this

Twelfth Day of November, 2002

*Attest:*

*Attesting Officer*

JAMES E. ROGAN
*Director of the United States Patent and Trademark Office*